US008055926B2

(12) United States Patent
Piper et al.

(10) Patent No.: US 8,055,926 B2
(45) Date of Patent: Nov. 8, 2011

(54) AGGREGATE POWER DISPLAY FOR MULTIPLE DATA PROCESSING SYSTEMS

(75) Inventors: Scott Alan Piper, Bothell, WA (US); Karen April Taylor, Carnation, WA (US)

(73) Assignee: International Business Machines Corporation, Armonk, NY (US)

( * ) Notice: Subject to any disclaimer, the term of this patent is extended or adjusted under 35 U.S.C. 154(b) by 853 days.

(21) Appl. No.: 12/039,433

(22) Filed: Feb. 28, 2008

(65) Prior Publication Data

US 2009/0222682 A1  Sep. 3, 2009

(51) Int. Cl.
*G06F 11/30* (2006.01)
(52) U.S. Cl. ........................................ 713/340; 713/300
(58) Field of Classification Search .................. 713/300, 713/310, 340; 702/60, 61
See application file for complete search history.

(56) References Cited

U.S. PATENT DOCUMENTS

| 7,082,374 B2 | 7/2006 | Ranta ............................... 702/60 |
| 2005/0116836 A1* | 6/2005 | Perry et al. ................ 340/870.02 |
| 2005/0117050 A1 | 6/2005 | Jiang ............................... 348/372 |
| 2006/0058994 A1 | 3/2006 | Ravi et al. ........................ 703/23 |
| 2006/0277509 A1 | 12/2006 | Tung et al. ......................... 716/5 |
| 2007/0094527 A1* | 4/2007 | Frietsch et al. ............... 713/340 |
| 2008/0027961 A1* | 1/2008 | Arlitt et al. .................... 707/101 |

OTHER PUBLICATIONS

IBM Systems Director Active Energy Manager for x86 V3.1 enables systems platform management and monitoring across IBM System x servers Nov. 13, 2007.
PCT International Search Report, mailed Apr. 28, 2009, for PCT application EP2009/050673, 3 pages.

* cited by examiner

*Primary Examiner* — Thomas Lee
*Assistant Examiner* — Paul Yanchus, III
(74) *Attorney, Agent, or Firm* — Thomas E. Tyson

(57) ABSTRACT

The present invention provides a method for providing aggregate power consumption information for hundreds or thousands of data processing systems interconnected in a network. In one embodiment, a method is provided that receives power consumption information for each of the data processing systems along with time intervals associated with this information. The power consumption information is analyzed to provide the power consumption of the total number of data processing systems. This is accomplished by selectively computing total power consumption for selected time values.

13 Claims, 7 Drawing Sheets

AGGREGATE POWER DISPLAY FOR MULTIPLE DATA PROCESSING SYSTEMS

BACKGROUND OF THE INVENTION

1. Technical Field

The present invention relates to reporting aggregate (i.e., total) power consumption by numerous systems. In particular, the present invention relates to reporting aggregate power consumption by numerous data processing systems.

2. Description of the Related Art

Data centers have provided a central location to house data processing equipment including networking equipment, telecommunications equipment, and storage equipment. Such facilities have historically managed the power used by the data processing systems.

Historically, power management was accomplished by measuring the power consumed by each of the data processing systems at the same points in time, i.e., at a given point in time, the power consumed by each data processing system would be measured, and the resulting power consumption values could simply be summed to arrive at a total power consumption for the aggregation of all data processing systems at that point in time. However, as the number of data processing systems increased, this synchronized measurement activity became very difficult to accomplish. First, polling more than a few data processing systems simultaneously is very difficult. Each data processing system is typically polled by a separate thread of execution within the program doing the polling, and the number of simultaneously executing threads is limited in practice to a few dozen or a few hundred at most. Second, the power consumption information may be returned at different times because of network or system latencies. Additionally, the use of different types of data processing systems with different power measurement circuits that update at different intervals makes it very difficult, if not impossible, to synchronize any measurement of power consumption.

What is needed, therefore, is a system and method that provides the ability to measure the aggregate or total power consumed by a large number of data processing systems without requiring that each of those data processing systems be polled at the same points in time.

SUMMARY

In accordance with the present invention, a method for providing aggregate power consumption information for a number of data processing systems interconnected in a network is disclosed. The method includes a first step of receiving a number of recorded power consumption files from each of a number of data processing systems where each file includes a system identifier, a time interval consisting of an interval begin time and interval end time, and an average power consumption value for that data processing system during that time interval. The recorded power consumption files have intervals that are unique with respect to files from other data processing systems meaning that each interval begin time, end time and duration need not be the same as and are not synchronized with the file intervals of other data processing systems. The next step is summing the power consumption for each data processing system for selected time units to provide an aggregate total power consumption for all the data processing systems.

In one embodiment of the present invention, a computer program product stored in a computer operable media is provided. The computer operable media contains instructions for execution by a computer, which, when executed by the computer, causes the computer to implement a method for determining aggregate power consumption for a number of data processing systems. This method includes the steps of, first, receiving several recorded power consumption samples from each of the data processing systems where each sample includes the average power consumed during a time interval. Second, receiving a request to display the aggregate power consumed by all of the data processing systems during a specified reporting time period. The next step is organizing the power consumption samples in the time sequence according to the samples' time intervals. Then, determining if all the data processing systems have reported power consumption during the time of the reporting time period. If any data processing system has not reported power consumption during the reporting time period, an event is recorded for that time interval which the data processing system is not reporting power consumption and this event is displayed. Continuing for all time units where power consumption was reported by all the data processing systems, summing the power consumption for each data processing system for selected time units during the reporting time period to provide aggregate or total power consumption for that reporting time period. The selected time units are those time units at the beginning or end of time intervals where a data processing system power consumption value changes. The last step is displaying of the representation of the total power consumption value over this reporting time period. This is commonly a graph showing power consumption over time.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

The following is intended to provide a detailed description of an example of the invention and should not be taken to be limiting of the invention itself. Rather, any number of variations may fall within the scope of the invention, which is defined in the claims following the description.

The present invention is a method, system, and computer program product that provides the aggregate power consumption of a number of data processing systems over a reporting time period provided by a user. Each data processing system communicates the average power consumed during a series of time intervals to the power management program which stores these samples or files for each data processing system in a database. When an operator directs the power management program to display the total power consumed by all of the data processing systems during a reporting time period, the power management program implements the steps of, first, obtaining all of the individual data processing system power consumption samples that contain power consumption data during the reporting time period, organizing these samples in a time sequence in accordance with the samples' time intervals. Then, determining if, for any time during the reporting time, there is a missing power consumption value from any of the data processing systems. If so, an event is prepared for display to the user reporting the time and the data processing system when no power consumption information is available. Then, for the remaining time units during the reporting time, this method sums the power consumption for each data processing system for selected time units during the reporting time to provide a total power consumption value for each of these times during the reporting time period. Lastly, this total power consumption information is displayed to the user together with any events.

Figure 1:
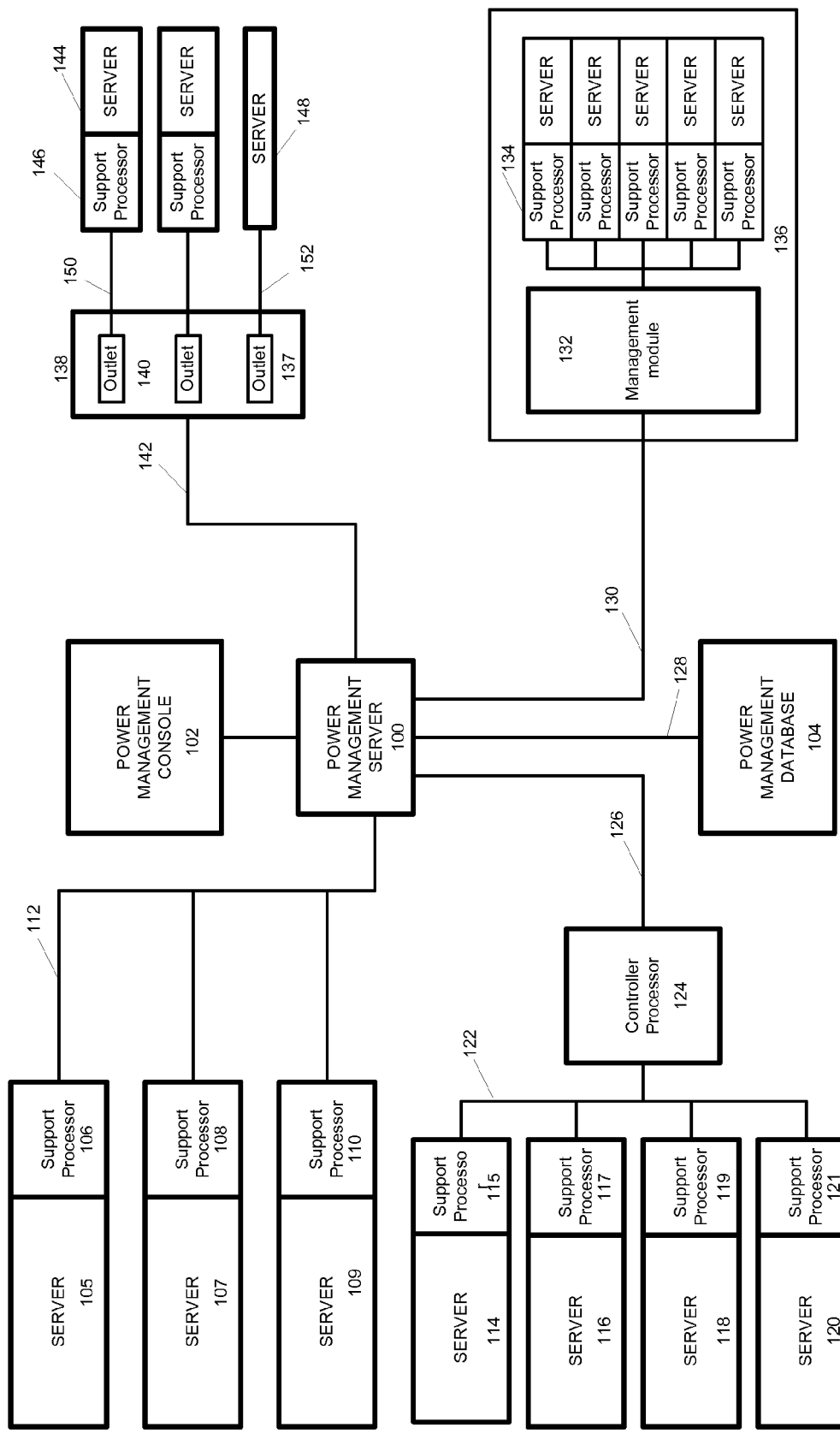
FIG. 1 is a block diagram illustrating several data processing systems connected to a power management system in a data center configuration.

FIG. 1 is a block diagram illustrating a typical data center including several data processing systems that are interconnected to a power management server that provides power management information to a data center operator at the power management console 102. Data processing systems 105, 107, and 109 are each individually connected to respective support processors 106, 108, and 110. The support processor performs a maintenance function for its connected server and specifically, for the purposes of this discussion, provides power consumption information over a network 112 to a power management server 100.

Another set of servers 114, 116, 118, and 120 also include respective support processors 115, 117, 119, and 121. However the support processors are connected to a network 122 which is connected to a controller processor 124. This controller processor 124 gathers power consumption data from its connected support processors. This data is provided on network 126 to the power management server 100.

Another set of data processing systems in the data center is illustrated as assembly 136 containing several servers and support processors in a complex 134 connected to a management module 132 which acts as a service processor. The management module 132 performs the task of assembling the power consumption information retrieved from the support processors of complex 134. This information is provided on network 130 to the power management server 100.

Lastly, a server 144 connected to its support processor 146 is connected on line 150 to an intelligent power distribution unit 138 that includes outlets such as 140 and 137. The power distribution unit 138 includes circuitry to measure how much power is being drawn by each of the outlets. The power consumption information gathered is then provided over network 142 to the power management server 100. Therefore a server 148 can connect directly to its outlet 137 via power connection 152 and have its power consumption information recorded.

When the power management server 100 receives all of this power consumption information from these various servers of the data center, the power management server 100 stores this information in a power management database 104. When an operator desires to know the power consumption during a certain time period, the request is made over the power management console 102 to the power management server 100. The server 100 then gathers the power consumption information for this reporting time period from the power management database 104.

Figure 2:
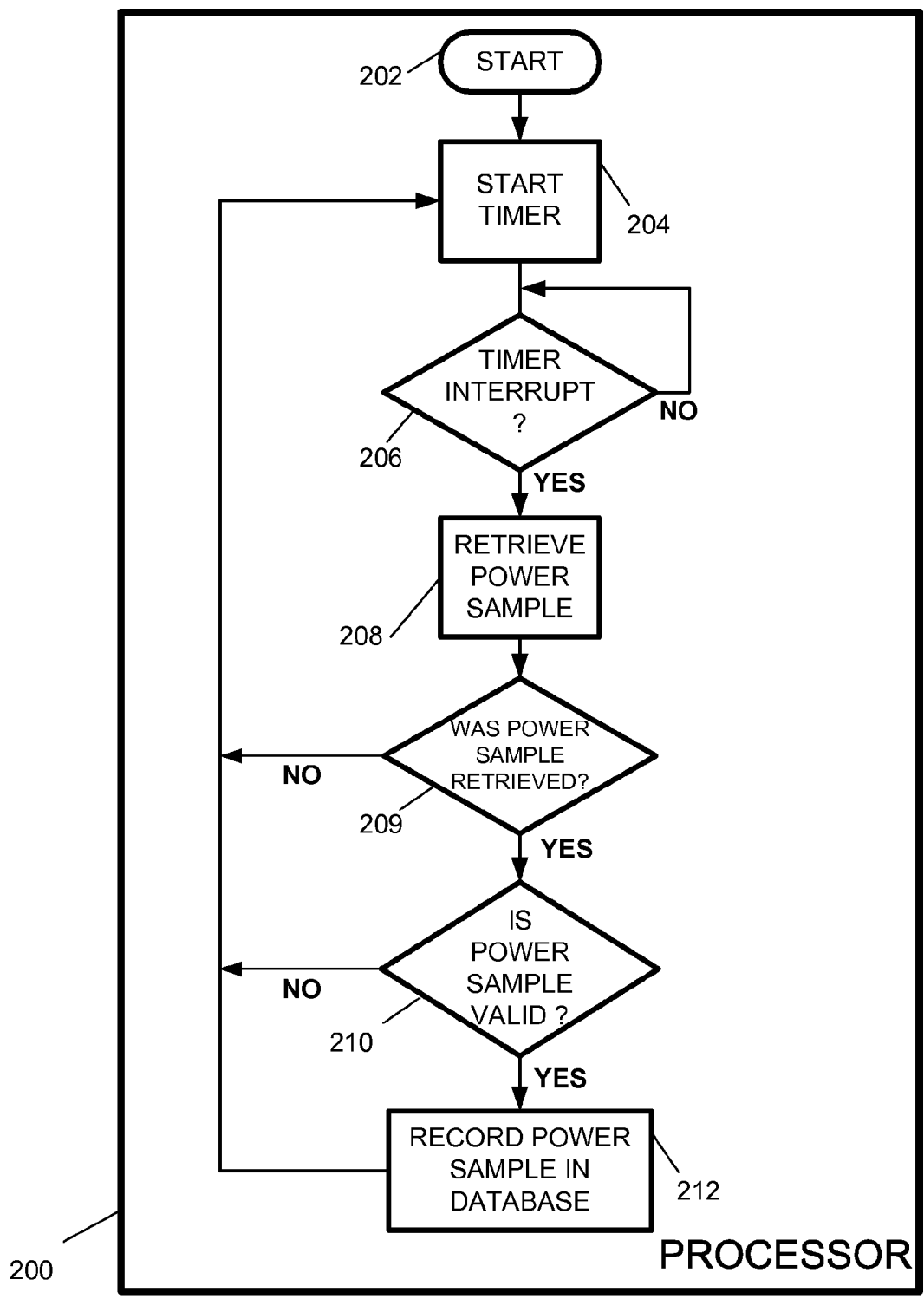
FIG. 2 is a flow chart illustrating the operation of a program to create a sample containing power consumed by a data processing system during a time interval.

FIG. 2 is a flowchart illustrating a program that gathers power consumption information for the power management server 100. This gathering program would be commonly executed on the power management server and be targeted at one of the data processing system support processors such as support processor 106 of FIG. 1. A separate gathering program would typically be targeted at each data processing system. At the program start 202, a timer is started in step 204. In operation, the timer will operate for a specified time period and then issue a timer interrupt at the end of this specified time period. In step 206, it is determined whether not the timer interrupt has occurred, i.e., whether the timer has timed out. When this interrupt does occur, in step 208, the power consumed by the target data processing system is retrieved as a sample. If a sample cannot be retrieved, because, for example, of a network connectivity problem, the program returns to the start timer step 204. Otherwise, in the preferred embodiment, the sample is the average power consumed during a time interval consisting of an interval start time corresponding to the start of the timer and ending with an interval end time when the timer provides its interrupt. In step 210, it is determined if the power sample is valid, i.e., whether the recorded power value and the time interval are a valid power sample. A sample may be invalid if, for example, too long of a time has elapsed since the last valid sample so that internal counters had rolled over, or if the data processing system has been power-cycled since the last valid sample. If not, the program returns to the start timer step 204. However if the power sample is valid, the program proceeds to step 212 to record the power sample in the database through the components discussed in FIG. 1. Also, it should be noted that if any power sample is determined to be invalid in step 210, the power value for the time interval will be missing.

Figure 3A:
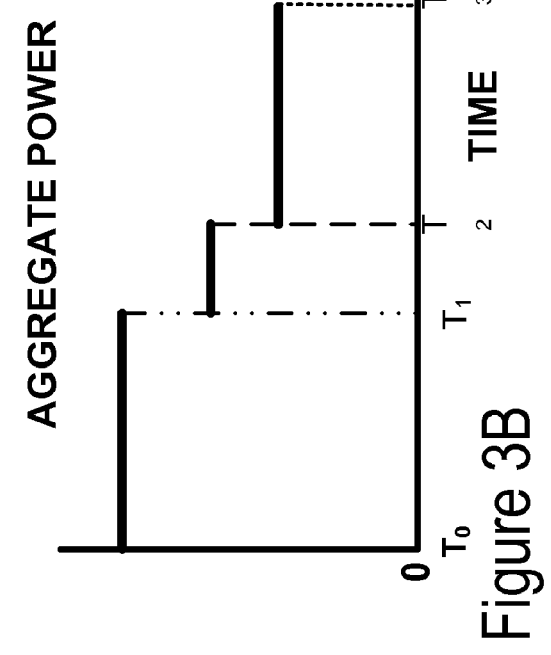
FIG. 3A is a graph illustrating power individually consumed by two data processing systems.
Figure 3B:
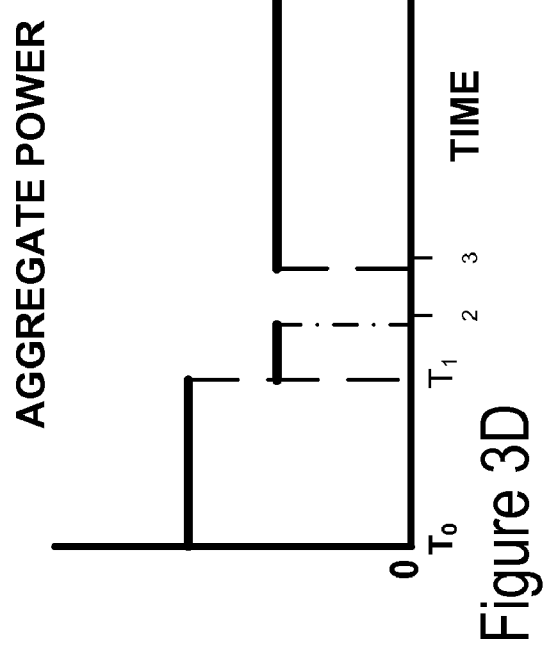
FIG. 3B is a graph illustrating the aggregate power consumed by the two data processing systems of FIG. 3A.

FIGS. 3A, 3B, 3C and 3D are graphs illustrating power consumption over time. In FIG. 3A, two data processing systems, System A and System B, provide power consumption information. System A provides one level of average power consumption during the time $T_0$ to $T_1$ and a second lower level of power consumption during time interval $T_1$ to $T_3$. System B provides another power consumption value between time intervals $T_0$ to $T_2$ and then a second lower power consumption during time interval $T_2$ to $T_4$. In accordance with teachings of the present invention, the aggregate or total power for Systems A and B is shown as a graph in FIG. 3B. The first power value for System A and System B are summed together for the time interval of $T_0$ through $T_1$. However, at $T_1$ and $T_2$, the power value of system A was decreased which is illustrated in FIG. 3B at the interval $T_1$ through $T_2$. At $T_2$, System B then decreases its power consumption value which is illustrated in FIG. 3B at the interval of $T_2$ to $T_3$. The last time interval, from $T_3$ to $T_4$, the teachings of this invention require that no power be recorded for that time interval $T_3$ to $T_4$ but rather an event be recorded and displayed to the operator indicating that during time $T_3$ to $T_4$, System A did not report any power usage. It was determined that this was the better alternative rather than reporting the System B power consumption since such a report would be misleading causing the operator to think that the total power being consumed by both System A and System B was only the power that was reported for System B. The absence of the power value for System A could involve an invalid sample during an interval when, in fact, System A was consuming power, or could simply be the result of System A not having been polled again yet. Therefore, the event notifies the operator of this anomaly. However, in an alternative embodiment, reporting the known power consumed during a period when one or more data processing systems is not reporting would be possible and maybe preferred in situations where an operator would find this useful. In such an embodiment, the remaining consumption would be reported with the event notifying the operator of the data processing system that failed to report power consumption. In other words for the example in FIGS. 3A and 3B, the event notice detailing that System A was not reporting power would also include the System B power consumption that was reported.

Figure 3C:
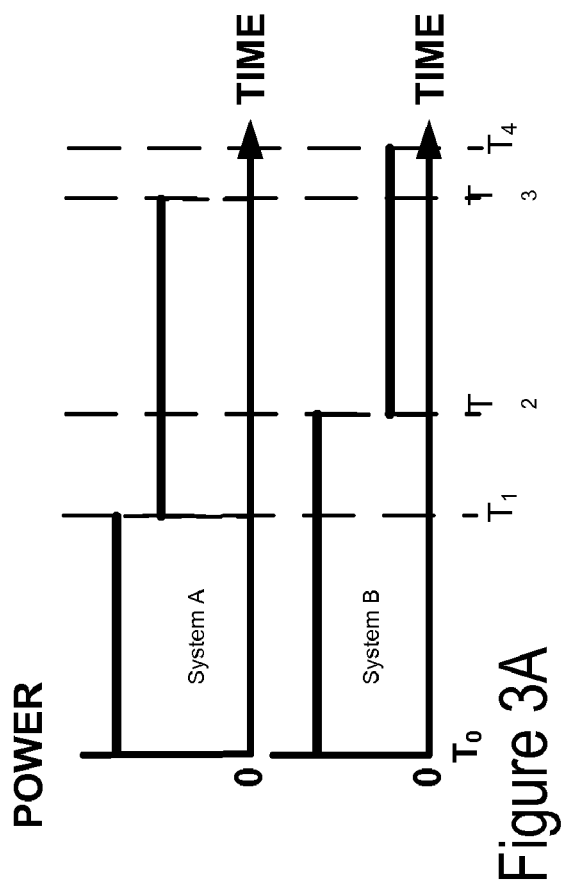
FIG. 3C is a graph illustrating power individually consumed by two data processing systems and illustrating a power interruption for one of the data processing systems.
Figure 3D:
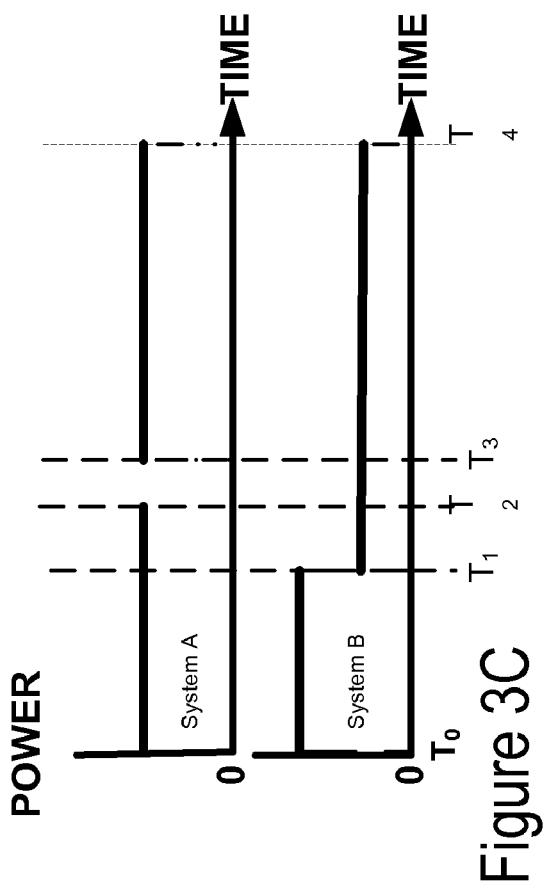
FIG. 3D is a graph illustrating the aggregate power consumed by the two data processing systems of FIG. 3C.

FIG. 3C illustrates power consumption for System A and System B and FIG. 3D illustrates the total power for both systems during the period in a manner similar to that discussed for FIG. 3A and FIG. 3B. In FIG. 3C, the difference is that at time interval $T_2$ no power is reported for System A until the start of the interval at $T_3$. Again, according to the above discussion, the total aggregate power disclosed to the operator and illustrated in FIG. 3D, shows that no power was reported between the time interval of $T_2$ to $T_3$.

Figure 4:
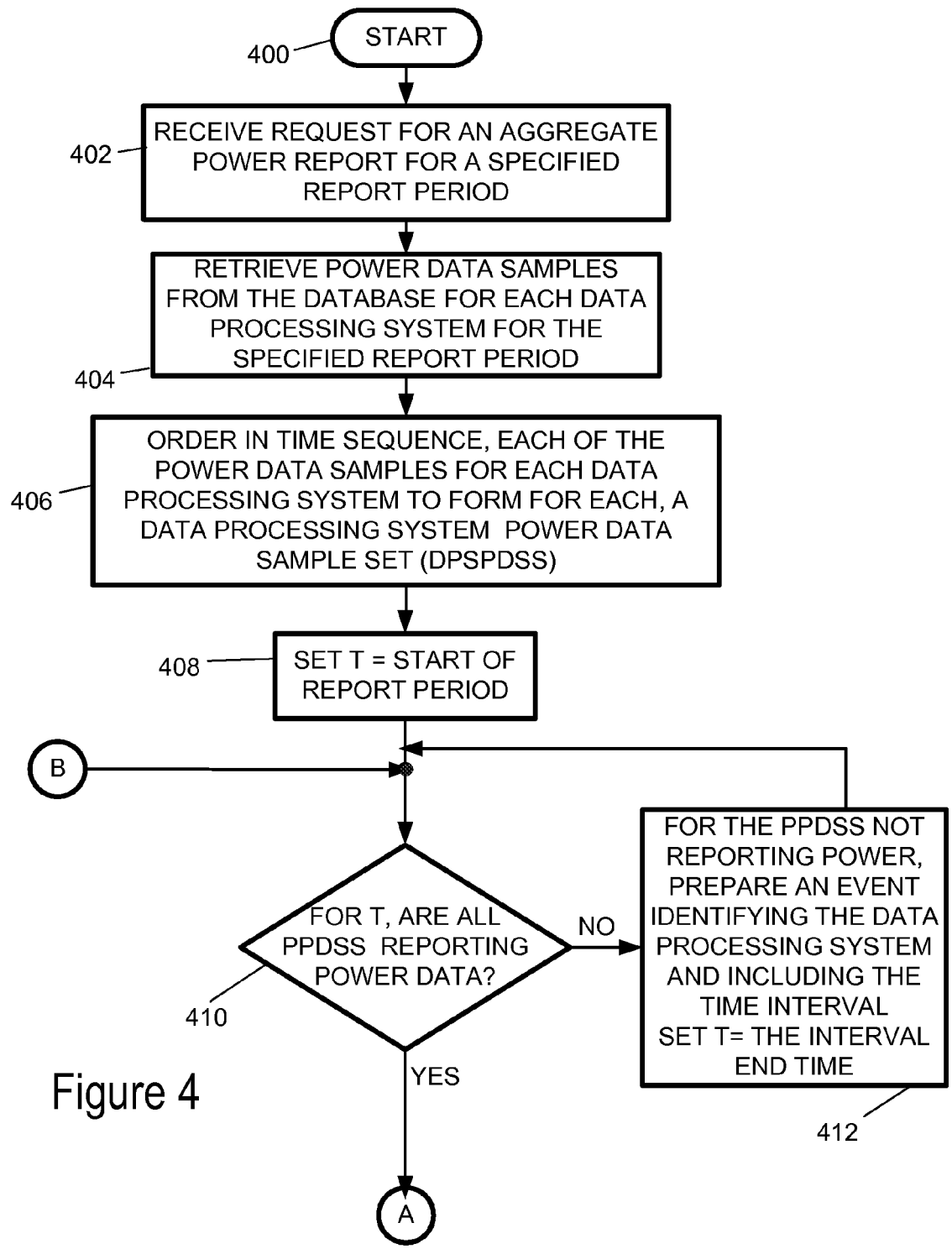
FIGS. 4 and 5 are flowcharts illustrating the operation of the program that obtains power samples from a group of data processing systems and computes the total aggregate power consumed by these data processing systems.
Figure 5:
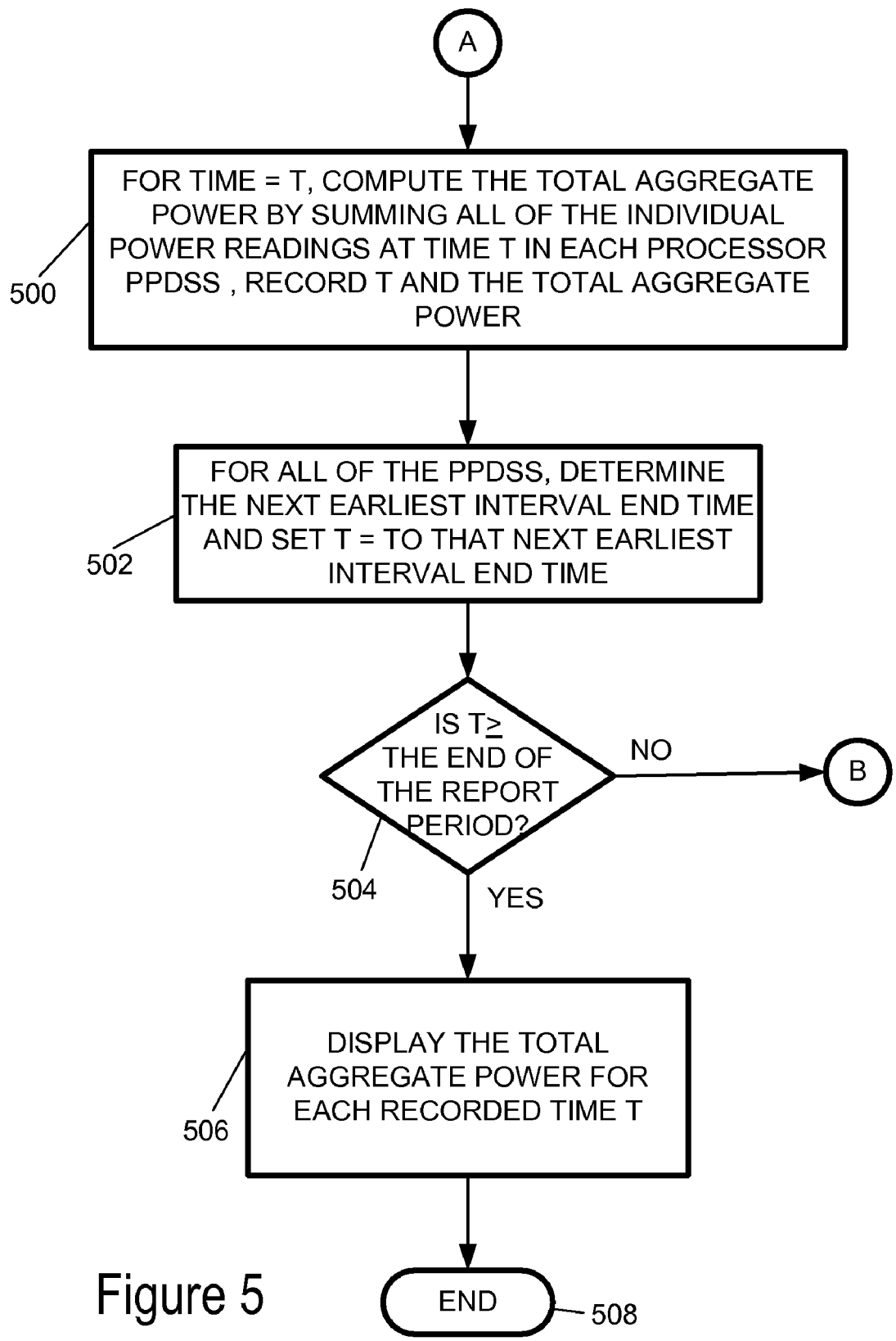

FIGS. 4 and 5 illustrate the data gathering and display function of the power management system for the data center. In this program, the operator of the data center is requesting the total power consumption of all of the data processing systems in the data center for a specific reporting time period. In order to provide this information, the program gathers all of the power consumption data samples that provide power consumption information during the requested time period. These samples are organized in a time sequence for the requested time period and then examined. Any absence of power consumption data is first determined in order to provide the appropriate event messages as discussed previously. Then, for the remaining time periods, the power consumption data is summed by using only selected time points during the reporting time period. The invention takes advantage of the fact that the average power consumption by any data processing system is constant during its time interval. Therefore, only the power consumed at certain times during the intervals need to be summed to provide an accurate total/aggregate power consumption value for all of the data processing systems in the data center. These certain times are the interval begin time and interval end time for the samples for each of these data processing systems.

In an alternate embodiment, instead of using a counter T to iterate through the time intervals for all the data processing systems, the time interval data for two systems is compared and analyzed, then that result is compared and analyzed with another system. This continues until all system time intervals had been compared and analyzed.

Referring to FIG. 4, the program start 400 proceeds to step 402 to receive the request for the aggregate power used by the data processing systems during a specified reporting time period. Next in step 404, the program collects only power data samples for each of the data processing systems for this specific time period. In step 406, the samples are ordered in time sequence for each of the data processing systems to form a data processing system power data samples set (DPSPDSS). In other words, where no data samples are missing, the time intervals organized in the sequence will cover the reporting time period. Then a variable T representing a time unit counter is initialized at the start of the reporting time period and selectively advanced to determine the total power consumed. First, in step 410, for the value T, the power data in the data processing system power data sample sets are examined to determine if any sample is missing for that time value T. If there is a missing time value, the program proceeds to step 412 to determine which data processing system is missing power consumption data for that time value T. In step 412, the program prepares an event to display information to the operator identifying the data processing system and identifying the time interval in which the power data is absent. Afterwards, the variable T is set to this missing interval end time and the program proceeds back to step 410 to examine the power and data for the new value of T.

If, in step 410, all of the data processing systems are reporting power data, the program proceeds through connector A to the process in FIG. 5. In FIG. 5, the sequence continues with step 500 which, for T, sums all of the power readings for each of the data processing systems and records this as the aggregate power for time value T. Then, in step 502, the program determines for all the DPSPDSS samples, the next earliest interval end time and sets T to be equal to that next earliest interval end time. On performing this operation, all the values of T between that of step 500 and the determined next earliest interval in time in step 502 are not used in the computation of the aggregate powers consumption because the power consumption value for each of the data processing systems is constant during this period. According to the calculation, there will be no T values between the start interval and the next earliest interval determined in step 502. Then, in step 504, the incremented value of T is compared to the time value representing the end of the report period. If T is greater than or equal, the program proceeds to step 506 to display the total aggregate power values computed for each of the values of T as a graph. However, if T has not exceeded the end of the report period time, the program proceeds through connector B to the process in FIG. 4.

In order to appreciate the efficient features of this invention in providing the aggregate power consumption for a set of data processing systems, the following example is presented. It should be understood that, for this example, the number of data processing systems is intentionally kept low to provide an easier understanding of the process. However, it should also be easily appreciated that a data center including hundreds or thousands of data processing systems would provide a very complex and challenging task in determining the aggregate power for all of the data processing systems during any reporting time period.

TABLE 1

| Sample Number | Interval Begin Time | Interval End Time | Average Power |
|---|---|---|---|
| SYSTEM X | | | |
| 1 | 1 | 12 | 10 |
| 2 | 12 | 18 | 15 |
| 3 | 18 | 26 | 3 |
| 4 | 26 | 30 | 1 |
| SYSTEM Y | | | |
| 1 | 1 | 10 | 12 |
| 2 | 10 | 21 | 8 |
| 3 | 21 | 27 | 5 |
| 4 | 27 | 30 | 10 |
| SYSTEM Z | | | |
| 1 | 1 | 8 | 4 |
| 2 | 8 | 14 | 7 |
| 3 | 14 | 19 | 15 |
| 4 | 19 | 23 | −1 |
| 5 | 23 | 30 | 14 |

Figure 6:
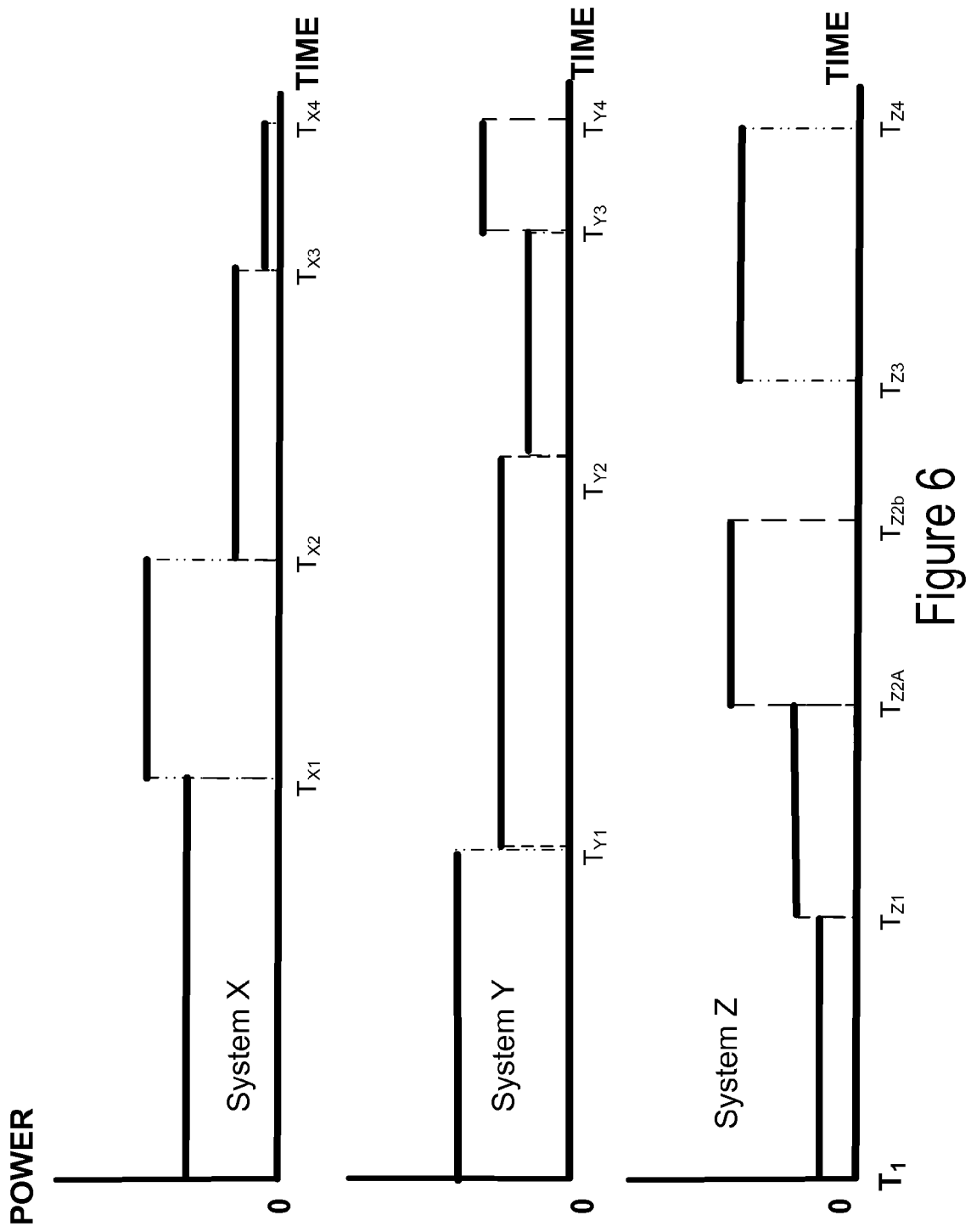
FIG. 6 is a graph illustrating power consumption over time by three data processing systems.

Table 1 illustrates a data center consisting of three data processing systems: System X, System Y and System Z. For these three systems, power samples have been obtained for a contiguous time between a time value of 1 to the time value of 30. Each of these samples include interval begin times and interval end times along with the average power consumed by that system during the interval time period. FIG. 6 is a graphical representation of the samples for these times. Again, the objective is to provide an aggregate power graph illustrating the total power consumed by these three data processing systems during times T1 to T11=Tx4=Ty4=Tz4=30 which is illustrated in FIG. 7.

Returning to the process of FIG. 4, in step 402 this example provides a request for the aggregate power for a reporting period between times 1 to 30. In step 404, the power data samples are collected for each data processing system. In step 406, these power data samples are then organized in time sequence. Alternatively, the power consumption data samples can be organized in a time sequence fashion when received and stored initially. This is done for the example in Table 1. Each sample is arranged in time sequence with the other samples for that data processing system in Table 1. Initially, the time variable T is set to 1. In step 410, it is determined that all of the systems are reporting power values. The program proceeds to step 500 in FIG. 5 to compute for T=1, the aggregate power by summing the average power values for Systems X, Y and Z and this number is recorded. In step 502 the next earliest interval end time is determined. Examining FIG. 6, the next earliest interval end time is $T_{Z1}$, so the time variable T is set to this value. In step 504, it is determined that this is not greater than or equal to the end of the reporting time period so the program proceeds back to step 410 to determine if all data processing systems are reporting power values.

Figure 7:
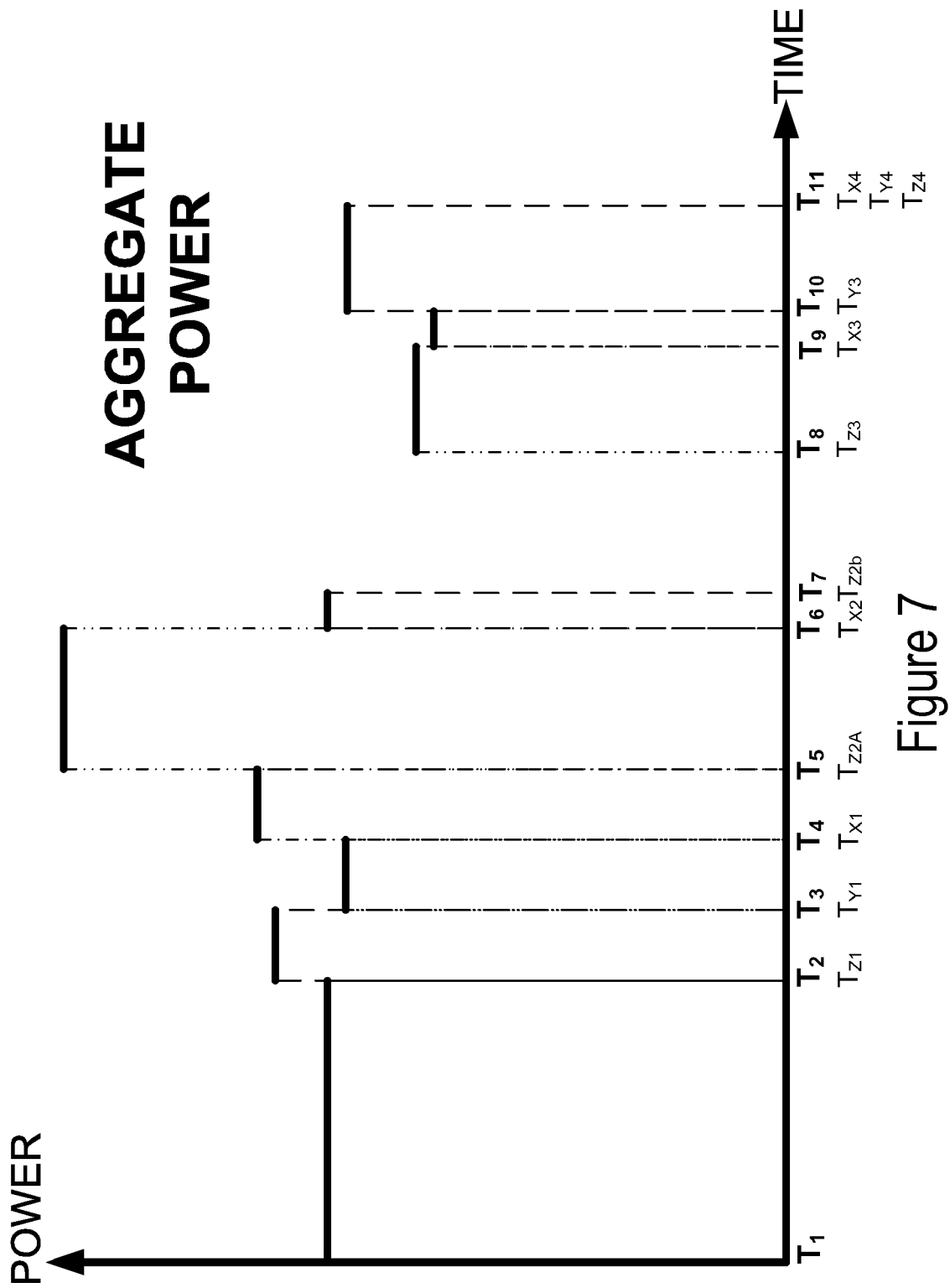
FIG. 7 is a graph illustrating the aggregate power computed for the three data processing systems of FIG. 6.

It can be observed that, according to Table 1, the values in FIG. 7 will be T1 equals 1, T2 equals 8, T3 equals 10, T4 equals 12, T5 equals 14, and T6 equals 18. At this point, step 410 will determine that Systems Z is not reporting power during the time interval of 19 to 23. Therefore, an event will be issued informing the operator that from a time period of 19 to 23, System Z reported no power and there will be no aggregate power reporting for the other data processing systems of the data center for that interval.

Then, in step 412, the time variable T is set to the interval end time for the missing sample resulting in T being 23. Then the program returns to step 410 and then to steps 500 and 502 until T is incremented to a value of 30. At that point the program proceeds to step 506 to prepare the display of the total aggregate power illustrated in FIG. 7.

TABLE 2

| T1 | T2 | T3 | T4 | T5 | T6 | T7 | T8 | T9 | T10 | T11 |
|---|---|---|---|---|---|---|---|---|---|---|
| 1 | 8 | 10 | 12 | 14 | 18 | 19 | 23 | 26 | 27 | 30 |

Table 2 illustrates the values of time in the graph in FIG. 7 in relationship to the time units of the systems of samples in Table 1. It should be apparent that the computation of the power that total power consumption values for only 11 data points is far more efficient than using a time unit by time unit computation process that results in over 30 computations.

While particular embodiments of the present invention have been shown and described, it will be obvious to those skilled in the art that, based upon the teachings herein, changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method for providing aggregate power consumption information for a plurality of data processing systems interconnected in a network to form an assemblage of data processing systems, said method comprising the steps of:
   A) receiving a plurality of recorded power consumption files from each of the data processing systems, each file including a system identifier, a time interval consisting of an interval begin time and an interval end time, and an average power consumption value for that data processing system during that time interval, the recorded power files time intervals for each data processing system being unique in relation to time intervals for recorded power files of other data processing systems and wherein the number of time units in a recorded power consumption file time interval varies in relation to other time intervals for that data processing system and varies in relation to the number of time units in time intervals of other recorded power files for other data processing system; and
   B) summing the power consumption for each data processing system for selected time units to provide an aggregate assemblage power consumption.

2. A method according to claim 1 further including the steps of receiving a request to display the aggregate assemblage power consumption during a reporting time period; displaying the aggregate assemblage power consumption for each time unit over the reporting time period; determining if, during the reporting time period, that a data processing system has a missing power consumption file and, upon such occurrence, displaying an event.

3. A method according to claim 1 further including the step of storing the plurality of recorded power consumption files for each data processing system in a central database.

4. A method according to claim 2 wherein step B further includes the steps of:
   B1) ordering in time sequence, the data processing system's recorded power consumption files for a data processing system forming a file sequence set for each data processing system in the assemblage that includes the reporting time period,
   B2) ordering by time the file sequence sets of the assemblage and performing the steps of:
      B2a) determining the earliest interval begin time unit in the assemblage file sequence sets and setting the interval begin time to a start of the reporting time period if the earliest interval begin time is before the start of the reporting time, and setting a current time variable specifying a current time equal to such earliest time and initializing an aggregate assemblage power consumption value;

B2b) determining for each sequence set if a power consumption value has been provided for the current time from all data processing systems, and, B2b1) if so, adding its value to the aggregate assemblage power consumption value and determining the next earliest occurring recorded power interval time, incrementing the current time variable to such next earliest occurring recorded power interval time and recording the aggregate assemblage power consumption value for that current time until the current time variable exceeds that next earliest occurring recorded power interval time and proceeding to step (B2c), B2b2) if not, declaring an event for the current time unit and determining the next earliest occurring recorded power interval time when power consumption values have been provided for all data processing systems, setting the current time variable to such next earliest occurring recorded power interval time and proceeding to step (B2c), and B2c) determining if the new current time is less than that last of the power consumption record interval end times, and if so returning to step (B2b), or, if not, proceeding to the step of displaying the aggregate assemblage power consumption for each time unit over the reporting time period.

5. A computer program product stored in a non-transitory computer operable media, the non-transitory computer operable media containing instructions for execution by a computer, which, when executed by the computer, causes the computer to implement a method for determining aggregate power consumption information for a plurality of data processing systems interconnected in a network to form an assemblage of data processing systems, the method comprising the steps of:

A) receiving a plurality of recorded power consumption files from each of the data processing systems, each file including a system identifier, a time interval consisting of an interval begin time and an interval end time, and an average power consumption value for that data processing system during that time interval, the recorded power files time intervals for each data processing system being unique in relation to time intervals for recorded power files of other data processing systems and wherein the number of time units in a recorded power consumption file time interval varies in relation to other time intervals for that data processing system and varies in relation to the number of time units in time intervals of other recorded power files for other data processing system; and B) summing the power consumption for each data processing system for selected time units to provide an aggregate assemblage power consumption.

6. The computer program product of claim 5 wherein step A includes storing the plurality of recorded power consumption files for each data processing system in a central database.

7. The computer program product of claim 5 further including the steps of receiving a request to display the aggregate assemblage power consumption during a reporting time period; displaying the aggregate assemblage power consumption for each time unit over the reporting time period; determining for each time unit in the reporting period when the recorded power consumption files do not provide power consumption information for one or more data processing systems and, if so, displaying such missing power consumption information as an event for that time unit.

8. The computer program product of claim 7 wherein step B further includes the steps of:

B1) ordering in time sequence, the data processing system's recorded power consumption files for a data processing system forming a file sequence set for each data processing system in the assemblage that includes the reporting time period, B2) ordering by time the file sequence sets of the assemblage and performing the steps of:

B2a) determining the earliest interval begin time unit in the assemblage file sequence sets and setting the interval begin time to a start of the reporting time period if the earliest interval begin time is before the start of the reporting time, and setting a current time variable specifying a current time equal to such earliest time and initializing an aggregate assemblage power consumption value;

B2b) determining for each sequence set if a power consumption value has been provided for the current time from all data processing systems, and, B2b1) if so, adding its value to the aggregate assemblage power consumption value and determining the next earliest occurring recorded power interval time, incrementing the current time variable to such next earliest occurring recorded power interval time and recording the aggregate assemblage power consumption value for that current time until the current time variable exceeds that next earliest occurring recorded power interval time and proceeding to step (B2c), B2b2) if not, declaring an event for the current time unit and determining the next earliest occurring recorded power interval time when power consumption values have been provided for all data processing systems, setting the current time variable to such next earliest occurring recorded power interval time and proceeding to step (B2c), and B2c) determining if the new current time is less than that last of the power consumption record interval end times, and if so returning to step (B2b), or, if not, proceeding to the step of displaying the aggregate assemblage power consumption for each time unit over the reporting time period.

9. A power management system comprising:

a plurality of data processing systems, each data processing system including power monitor circuitry;

a network connected to each power monitor circuitry of each data processing system;

a power management processor including a display, and execution unit, and a program memory containing a program method for providing aggregate power consumption information for the plurality of data processing systems, the program method including the steps of:

A) receiving a plurality of recorded power consumption files from each of the data processing systems, each file including a system identifier, a time interval consisting of an interval begin time and an interval end time, and an average power consumption value for that data processing system during that time interval, the recorded power files time intervals for each data processing system being unique in relation to time intervals for recorded power files of other data processing systems and wherein the number of time units in a recorded power consumption file time interval varies in relation to other time intervals for that data processing system and varies in relation to the number of time units in time intervals of other recorded power files for other data processing system; and B) summing the power consumption for each data processing system for selected time units to provide an aggregate assemblage power consumption.

10. A power management system according to claim 9 further including at least one service processor connected to a second plurality of data processing systems.

11. A power management system according to claim 10 where at least one of said power monitor circuitry is contained internally within its data processing system.

12. A power management system according to claim 10 wherein the power management processor further includes a database storage memory.

13. A method for providing aggregate power consumption information for a plurality of data processing systems interconnected in a network to form an assemblage of data processing systems, said method comprising the steps of:

A) receiving a plurality of recorded power consumption files from each of the data processing systems, each file including a system identifier, a time interval consisting of an interval begin time and an interval end time, and an average power consumption value for that data processing system during that time interval, the recorded power files time intervals for each data processing system being unique in relation to time intervals for recorded power files of other data processing systems and wherein the number of time units in a recorded power consumption file time interval varies in relation to the number of time units in time intervals of other recorded power files for other data processing system; and B) summing the power consumption for each data processing system for selected time units to provide an aggregate assemblage power consumption.

\* \* \* \* \*